United States Patent [19]

Casler, Jr.

[11] Patent Number: 4,568,816

[45] Date of Patent: Feb. 4, 1986

[54] METHOD AND APPARATUS FOR MANIPULATOR WELDING APPARATUS WITH IMPROVED WELD PATH DEFINITION

[75] Inventor: Richard J. Casler, Jr., Newtown, Conn.

[73] Assignee: Unimation, Inc., Danbury, Conn.

[21] Appl. No.: 486,405

[22] Filed: Apr. 19, 1983

[51] Int. Cl.[4] ............................................... B23K 9/12
[52] U.S. Cl. .......................... 219/124.34; 219/125.1; 901/5; 901/42; 901/47
[58] Field of Search ..................... 219/124.34, 124.22, 219/125.11, 125.1; 901/42, 47, 3, 5; 358/101

[56] References Cited

U.S. PATENT DOCUMENTS 4,380,696  4/1983  Masaki ............................ 219/124.34

Primary Examiner—Clifford C. Shaw
Attorney, Agent, or Firm—Mason, Kolehmainen, Rathburn & Wyss

[57] ABSTRACT

Control apparatus for manipulator welding apparatus is provided that includes a vision correction system for workpiece sensing. During an initial teach mode, the manipulator is taught the desired welding path on a workpiece and data is recorded representing the welding path relative to a frame of reference defined by the workpiece. In addition to the data representing the taught welding path and the frame of reference, data representing one or more reference images or templates are also recorded in the teach mode. As successive workpieces are presented to the manipulator for performing the desired welding path, the control apparatus in a repeat work cycle mode is first controlled to measure and define the new location and orientation of the frame of reference in accordance with the workpiece. The new frame of reference data is utilized to modify the path data. In a preferred arrangement, a first repeat pass is performed by controlling the manipulator to move over the weld path in accordance with modified weld path data as determined from the new frame of reference data. The vision system utilizing an image processor detects the deviation between the first repeat pass welding path and the actual welding path of the workpiece. The control apparatus in response to the deviation data provided by the image processor in the first repeat pass modifies the first repeat pass weld path data to provide corrected welding path data for the welding of the actual workpiece during a second repeat pass with the weld being initiated at a predetermined point relative to the frame of reference.

16 Claims, 8 Drawing Figures

METHOD AND APPARATUS FOR MANIPULATOR WELDING APPARATUS WITH IMPROVED WELD PATH DEFINITION

BACKGROUND OF THE INVENTION

1. Field of the Invention

The present invention relates generally to manipulator welding apparatus and more particularly to control apparatus utilizing a vision correction system for workpiece sensing for detecting the deviation between a taught welding path and the actual seam to be welded where the welding path is determined relative to a frame of reference defined by the workpiece.

2. Description of the Prior Art

Various welding apparatus and vision detection systems have been proposed. For example, U.S. Pat. No. 4,380,696 which issued to I. Masaki on Apr. 19, 1983 and which is hereby incorporated by reference for all purposes provides a method and apparatus for teaching a welding path with respect to a workpiece at a reference position, moving the manipulator arm in accordance with the taught data during a first repeat pass for successive workpieces and utilizing a vision correction system for determining the deviation between a first repeat pass path and the actual welding path, and moving the manipulator to weld the actual welding path in a second repeat pass in accordance with corrected weld path data obtained by modifying the first repeat pass sensing path data in accordance with the obtained deviation. Further, application Ser. No. 239,621 filed by I. Masaki on Mar. 2, 1981 provides a method and apparatus for detecting any positional and orientational deviation of a workpiece from a reference position by means of a visual detection system and an image processor. Further, U.S. Pat. Nos. 4,348,578 and 4,306,144 disclose arrangements for performing the detection of images of the workpiece either by increasing the vision projector intensity during sensing or by interrupting the welding operation during sensing. Additionally welding apparatus with control arrangements are disclosed in U.S. Pat. Nos. 4,115,684, 4,086,522, 4,030,617, 4,105,937, 3,532,807, 4,148,061, 4,338,672, 3,840,739, 3,766,355, and 4,255,643.

While the above described arrangements are generally suitable for their intended use, there is a constant need for improved welding control apparatus with improved weld path definition for example where the start and end points of a weld path are desirably determined with respect to a workpiece. For example, in the prior art, the start and end point of a weld path must be located a distance away from the corner or edges of a workpiece to account for uncorrected variations in workpiece position tangential to the seam trajectory.

SUMMARY OF THE INVENTION

Accordingly it is a principal object of the present invention to provide a control method and apparatus for manipulator welding apparatus having a vision correction system for workpiece sensing that overcomes one or more of the above described disadvantages of the prior art arrangements by defining desired weld path data relative to a frame of reference defined by the workpiece.

It is another object of the present invention to provide a control method and apparatus for manipulator welding apparatus having a vision correction system for workpiece sensing wherein a desired welding path is taught on a workpiece during a teach mode and defined relative to a workpiece frame of reference, and for each successive workpiece presented to the manipulator a vision correction system in a first repeat mode detects the change between the taught workpiece frame of reference and the new or actual workpiece frame of reference, corrected path data is calculated from a sensing pass during the first repeat mode and the corrected path data is utilized during a second repeat pass to perform the welding along the desired path.

It is another object of the present invention to provide method and apparatus for manipulator welding apparatus wherein path correction data is obtained for a particular workpiece representing the deviation between a taught path and an actual workpiece path accounting for changes in workpiece position and orientation before the manipulator performs the welding of the desired welding path by defining the path relative to a workpiece-defined frame of reference or coordinate reference frame, detecting and defining the new coordinate reference for a workpiece at a position different than the taught position and welding along the desired path in accordance with modified weld path data defined relative to the new coordinate reference frame.

It is yet another object of the present invention to provide control apparatus for a manipulator that utilizes a vision sensing system to accurately determine the start and end points of a path relative to a workpiece coordinate reference frame and that utilizes this path determination data for modification of manipulator arm movement during a first repeat sensing pass and a second repeat welding pass of the weld trajectory to account for changes in workpiece position and orientation.

Briefly, these and other objects of the present invention are achieved by providing control apparatus for manipulator welding apparatus for accurately performing a taught welding path on successive workpieces and accounting for deviations in workpiece position and orientation from the workpiece on which the weld path was initially taught. The control apparatus includes a vision correction system for workpiece sensing. During an initial teach mode as an operator controls movement of the manipulator, the manipulator is taught the desired welding path on a workpiece by the appropriate recording and definition of data representing the welding path relative to a frame of reference defined by the workpiece. The frame of reference for example is a coordinate reference frame defined relative to the geometry of the workpiece such as a corner or a sharp slope discontinuity along the edge of the workpiece. In a preferred arrangement, the coordinate reference frame is defined by three points of a corner frame with the included angle or by two points along each of two lines defining the corner frame. The start and end points of a desired weld path trajectory as well as intermediate points are then defined relative to the coordinate reference frame. In addition to the data representing the coordinate reference frame and the taught welding path, data representing a reference image or template for the weld path and the corner frame points are also recorded in the teach mode. The reference image or template data is provided by a vision system including a camera carried by the manipulator arm. As successive workpieces are presented to the manipulator for performing the desired welding path, the control apparatus in a repeat work cycle mode is first controlled to measure and define the new location and orientation of the frame of reference in accordance with the workpiece orientation and position. The new frame of reference data is utilized to modify the path data. In a preferred arrangement, a first repeat pass is performed by controlling the manipulator to move over the weld path in accordance with modified weld path data as determined from the new frame of reference data. The vision system utilizing an image processor detects the deviation between the first repeat pass welding path and the actual welding path of the workpiece. The image processor by means of the visual detection in the first repeat pass provides deviation data representing the deviation between the first repeat pass path and the actual welding path of the workpiece. The control apparatus in response to the deviation data provided by the image processor in the first repeat pass modifies the first repeat pass weld path data to provide corrected welding path data for the particular workpiece orientation and position encountered by the manipulator. During a second repeat pass of the repeat work cycle mode, welding of the actual workpiece seam is performed in accordance with the corrected welding path data obtained in the first repeat pass with the weld being initiated at a predetermined point relative to the frame of reference. When successive workpieces are presented to the manipulator, the definition of the new frame of reference and the first and second repeat passes of the repeat mode are performed for each workpiece. Accordingly, the control apparatus provides for the accurate welding of the start, end and intermediate weld trajectory points with respect to a workpiece for changed workpiece orientation and position.

The invention both as to its organization and method of operation together with further objects and advantages thereof will best be understood by reference to the following specification taken in conjunction with the accompanying drawings.

DETAILED DESCRIPTION OF THE PREFERRED EMBODIMENT

Figure 1:
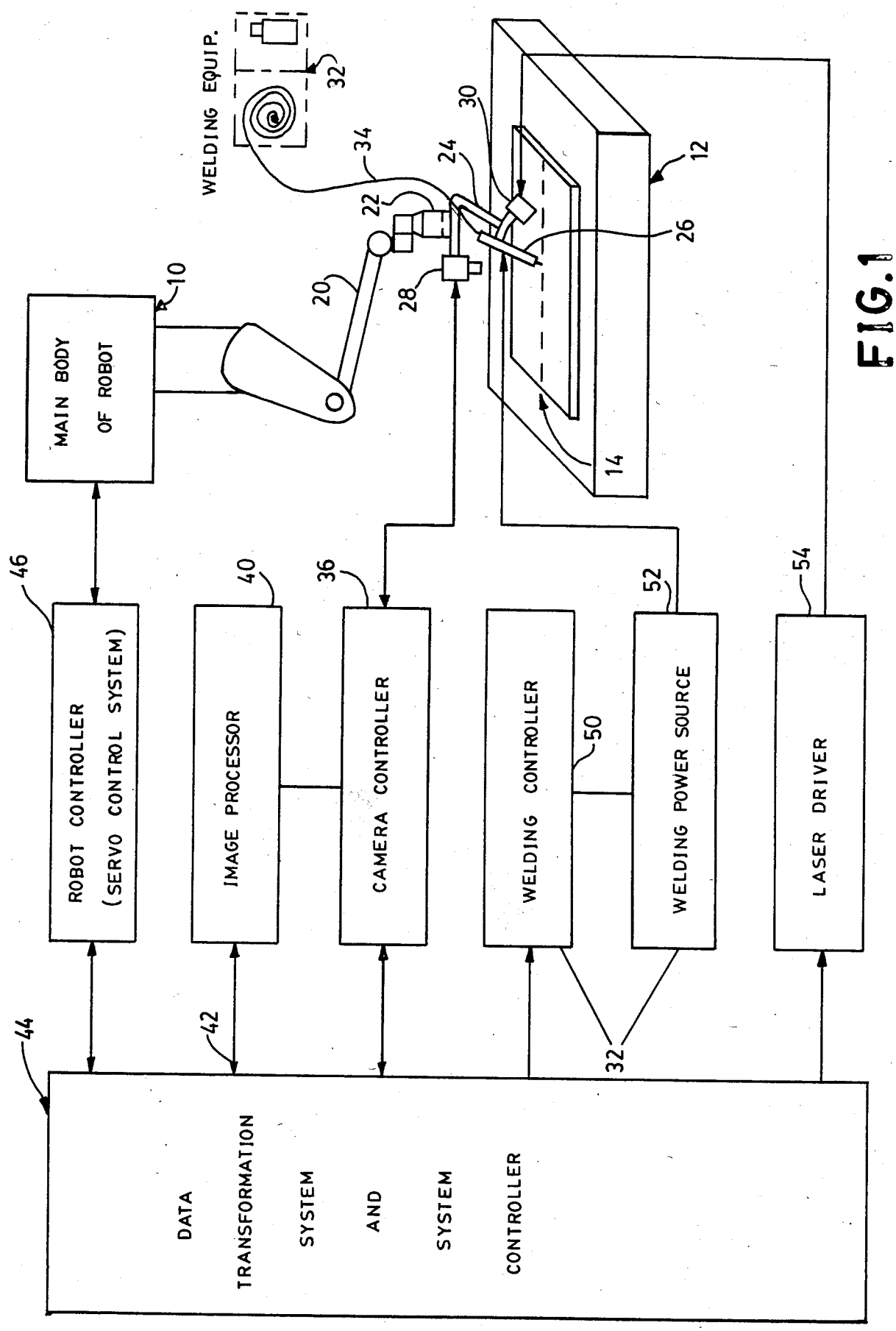
FIG. 1 is a perspective view of a programmable manipulator adjacent a workpiece welding station and a block diagram representation of the control apparatus of the present invention.

Referring now to FIG. 1, manipulator apparatus or robot 10 is illustrated adjacent a work station 12 to accomplish the welding of a workpiece generally referred to at 14 in accordance with the principles of the present invention. The workpiece 14, for example, includes two metal plates arranged in a specified manner which are to be welded along the abutting seam formed therebetween. The manipulator 10 includes a manipulator arm 20 that is provided with a hand or tool receiving portion 22. A manipulator hand arrangement 24 is positioned on the receiving portion 22.

In one arrangement of the present invention, the hand 24 carries a weld gun 26 and a camera or other suitable imaging device 28. An optical pattern projection unit 30 is arranged either on the hand 24 or at a suitable fixed reference position independent of the hand. The weld gun 26 is connected to welding equipment referred to generally at 32 that provides a welding wire feed system at 34 to the weld gun 26 along with other suitable electrical interconnections and a welding gas supply in accordance with conventional welding practices. The welding equipment also includes a welding controller 50 and a welding power source 52. Further, a laser driver stage 54 is provided for operation of the projection unit 30 as a laser head.

The camera 28 is controlled by and provides imaging signals to a camera controller arrangement 36 over signal and control lines 38. The camera controller arrangement 36 is connected to provide signals to an image processor 40. The camera 28, the optical projection unit 30, the camera controller 36 and the image processor 40 comprise a vision system substantially as shown and described in the aforementioned U.S. Pat. No. 4,380,696 and application Ser. No. 239,621.

The image processing unit 40 is interconnected over data lines 42 to a data transformation system and system controller 44. The data transformation system and system controller 44 controls operation of the manipulator welding system and controls operation of the manipulator 10 by means of a robot controller or servo control system referred to generally at 46. The data transformation system and system controller 44 supplies the appropriate control signals to the servo control system 46 as command signals to position the manipulator arm 20 in one or more controllable axes.

The manipulator 10 suitable for use in practice of the present invention includes various types of programmable manipulators or robots. One suitable manipulator 10 is commercially available from Unimation, Inc. as a PUMA (Trademark of Unimation, Inc.) type 760 arm. The PUMA type 760 manipulator arm shown in FIG. 2 includes a microprocessor based control system operating in accordance with VAL (Trademark of Unimation, Inc.) programming and control system for computer controlled robots and manipulators. Reference may be made to the publication "User's Guide To VAL, A Robot Programming And Control System" version 11, February 1979, 2nd Edition for a more detailed discussion of the operation of this type of manipulator. Another suitable manipulator is commercially available from Unimation, Inc. as a UNIMATE (Trademark of Unimation, Inc.) type 2000 manipulator.

The system controller 44 for the manipulator 10 of FIG. 1 in other arrangements utilizes the respective control system as further described in U.S. Pat. Nos.

3,661,051, 4,086,522, 4,163,183, 4,362,978, and 4,338,672 to which reference may be made for a more detailed discussion of suitable types of control systems for use in connection with the present invention.

In accordance with important aspects of the present invention and in one specific embodiment, in an initial teach mode an operator controls the manipulator arm 20 in the controllable axes to move the tip of the weld gun 26 over a desired welding path with respect to the taught workpiece 14. During the teach mode, appropriate welding path data is recorded in the system controller 44 representing taught points along the desired welding path relative to a frame of reference defined by the workpiece geometry. During a predetermined portion of the teaching mode, the projection unit 30 is operatively positioned to project a light pattern on the workpiece 14. In response to the projected light pattern, the camera 28 along with the camera controller 36 and the image processing unit 40 provide a reference or template image for storage along with the taught path data. The projection unit 30 projects an optical slit pattern on the workpiece 14 and the vision system components including the camera 28, the camera controller 36 and the image processing unit 40 detect the optical pattern as transformed by the shape of the surface of the workpiece 14. The reference or template image is taken at one or more suitable locations along the taught welding path as dependent upon the geometry of the welding path. Further, during the teach mode the frame of reference is determined by the camera 28, image processor 40 and the system controller 44 as will be explained in detail hereinafter.

During the teach mode, welding data is also recorded including desired weld speed and other appropriate parameters of the welding operation. In another specific embodiment, only the reference template image is taken with a reference work piece and the taught welding path is recorded during the first repeat pass of the first repeat workpiece as will be explained in detail hereinafter. The taught path for the first repeat work piece is then utilized for successive work pieces.

In accordance with important aspects of the present invention, as successive workpieces are presented to the manipulator 10 for welding, the manipulator 10 is controlled to perform a repeat mode including the definition of the new location and orientation of the frame of reference due to changed workpiece position. The new frame of reference data is utilized to modify the weld path data. In a preferred arrangement, the repeat mode also includes a first repeat pass during which the manipulator arm 20 is controlled to move over the weld path in accordance with modified weld path data as determined from the new frame of reference data and with the camera 28 operatively positioned over the path.

During the movement of the manipulator arm 20 in the first repeat pass over the path, the image processor 40 over data lines 42 provides deviation data from the detected workpiece images at suitable points along the welding path representing the deviation of the actual welding seam presented by the workpiece 14 from the taught welding path template image. The system controller 44 in accordance with the deviation data from the image processor 40 calculates and stores corrected welding path data for the present workpiece 14 accounting for any changes in location of the workpiece 14.

In a second repeat pass of the repeat mode, the weld gun 26 is operatively positioned over the workpiece 14 and the corrected path data calculated and stored in acordance with the first repeat pass is utilized to control the manipulator arm 20 to weld the desired welding path on the workpiece 14 in cooperation with the operation of the welding equipment 32.

Thus, the desired welding path is taught and recorded on a reference workpiece 14 during a single teach mode and as successive workpieces 14 are presented to the manipulator 10, the repeat mode is performed for each of the workpieces.

Figure 2:
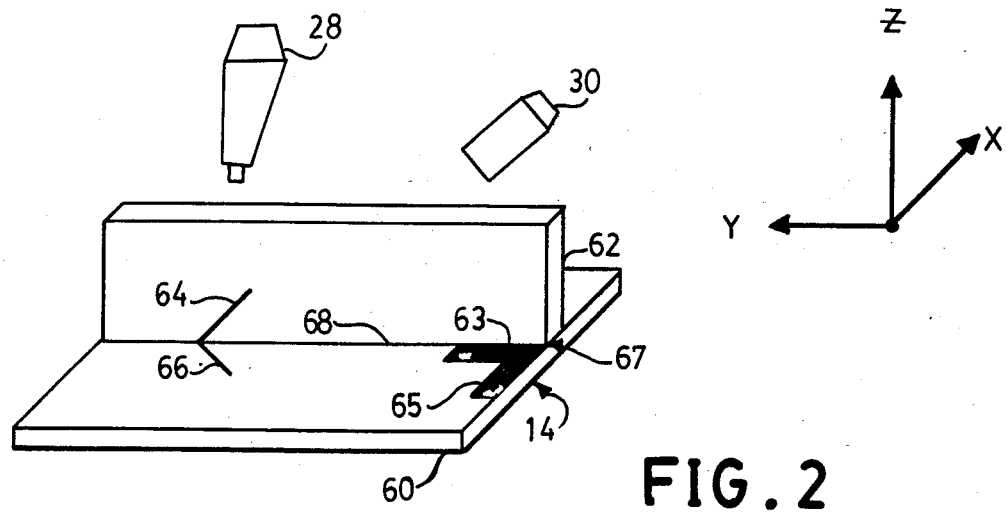
FIGS. 2 and 3 are perspective views representative of respective workpieces to be welded in accordance with the control apparatus of FIG. 1 and illustrating projected light patterns of the vision system and corner coordinate frames.

Considering now a brief discussion of typical workpieces 14 to illustrate the operation of the present invention and referring now to FIG. 2, the projection unit 30 projects an optical slit pattern onto the generally perpendicularly arranged workpiece portions 60, 62. The workpiece portions 60, 62 transform the optical pattern projected by the unit 30 in accordance with the surface shape and position of the workpiece portions; for example, as depicted by the line pattern 64 on workpiece portion 62 and the line pattern 66 on workpiece portion 60. This type of optical pattern projection is useful for path correction systems including arc welding, sealing, brazing and the like.

Thus, the camera 28 detects the transformed light pattern image including image pattern portions 64 and 66; the intersection of the lines 64, 66 defining the points along the intersection seam 68 of the workpiece portions 60, 62 to be welded for various positions of the camera 28 and the projection unit 30.

The optical pattern is also projected in the vicinity of the corner edge 67 defined by the workpiece portions 60, 62 at several predetermined location to define the frame of reference as a corner coordinate reference frame as indicated at highlighted portions 63, 65 and as will be explained in more detail hereinafter. The highlighted corner coordinate reference frame 63,65 is defined by the workpiece portions 60,62 and illustrates an appropriate frame of reference that defines a fixed relationship between the start and end points of a weld path as well as intermediate path points along the seam path 68. The corner coordinate frame represented by 63,65 is illustrative of one type of frame of reference that is defined by weldment workpieces such as at a corner or a sharp slope discontinuity.

In accordance with the present invention, the weld path such as 68 is defined relative to the frame of reference such as 63, 65 at corner 67 and thus the entire weld path 68 and trajectory defined thereby can be modified and redefined with respect to a newly positioned frame of reference due to changes in workpiece position and orientation.

Figure 3:
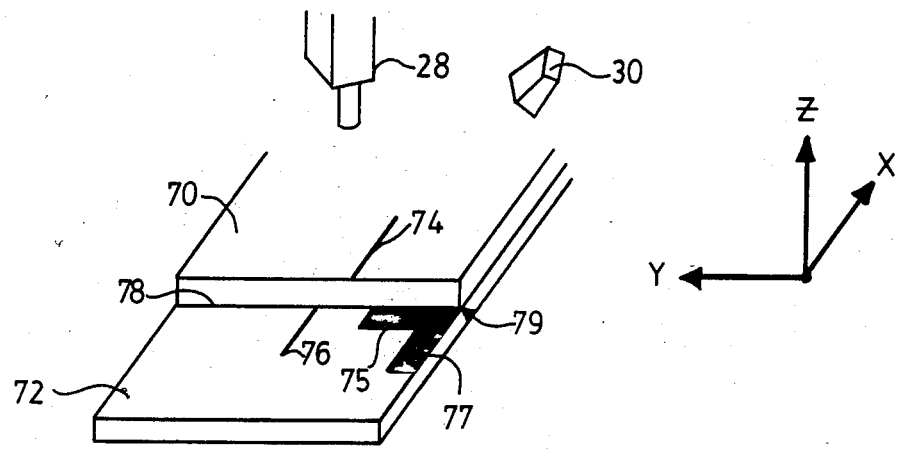

Referring additionally to FIG. 3, a second example of a welding application is illustrated therein for welding the lap seam at 78 between the generally planar and overlapping workpiece portions 70, 72. The optical projected slit pattern from the projection unit 30 forms an image as transformed by the shape of the workpiece portions 70, 72 including a first line image 74 on the workpiece portion 70 and a second line portion 76 on the workpiece portion 72. Further, at the corner edge 79, the coordinate corner reference frame as indicated at highlighted portions 75, 77 is defined and the weld path 78 is defined and recorded relative thereto.

Thus the respective workpiece images shown in FIGS. 2 and 3 are typical of the reference template image recorded by the image processor 40 in the teach mode for a reference workpiece and are also typical of the actual images formed by the successive workpieces in the repeat modes as detected by the camera 28 during the first pass of the repeat mode in accordance with operation on each successive workpiece.

In one specific arrangement of the present invention, the reference image 64, 66 is recorded at only one point along the teach path 68 since the geometry of the weld seam 68 results in a constant image being obtained at the various points along the desired welding path.

Figure 4:
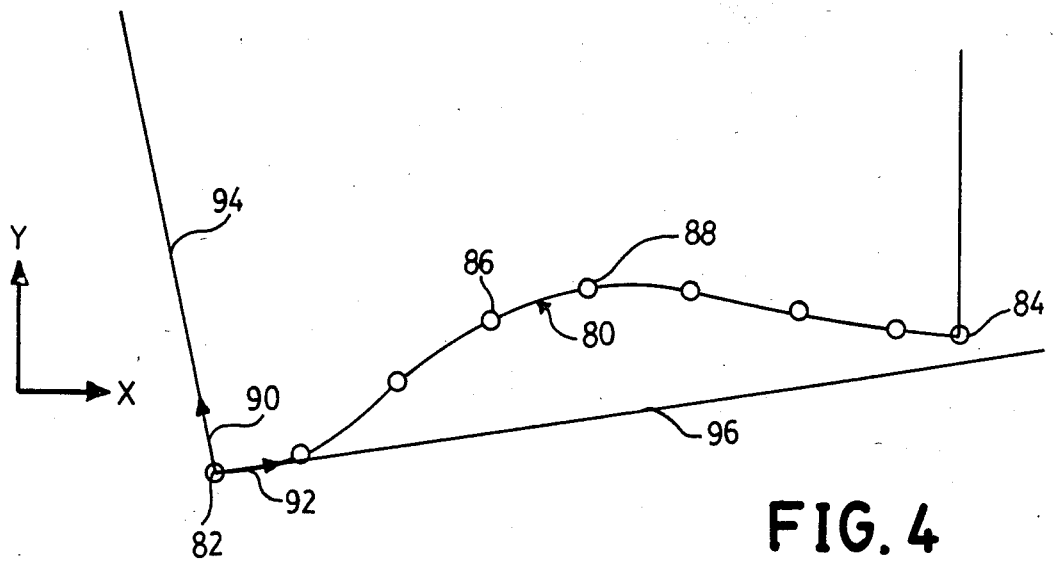
FIG. 4 is a graphical representation of a desired weld path to be performed relative to a frame of reference as a corner coordinate frame defined by the workpiece.

Considering now the teach and repeat modes of the present invention in more detail and referring now to FIG. 4, an illustrative weld path 80 is graphically represented in the X-Y world coordinate reference frame. The weld path 80 includes a weld start point 82, a weld finish point 84 and a plurality of intermediate path points e.g. 86, 88 that are utilized as sense points to enable appropriate accuracy in determining and correcting the weld path.

In accordance with important aspects of the present invention, the frame of reference defined by the workpiece is repersented in FIG. 4 by the vectors 90 and 92 as a corner coordinate reference frame, the vectors 90,92 being defined by the edge surfaces of the weld workpieces denoted by lines 94, 96 respectively and corresponding for example to the cover coordinate frame represented by the highlighted lines 63,65 of FIG. 2.

Thus, during the teach phase, the path data represented by the points 82, 84,86 and 88 for example are recorded relative to the frame of reference depicted by 90,92. Further, during the teach phase, data representing the corner coordinate frame is also recorded as will be explained in more detail hereinafter. Whereas the start weld point is shown at the intersection or origin of the corner coordinate frame 90,92, it should be understood that the start weld point in other specific applications is at another location relative to the coordinate frame as in the case of other intermediate path points such as 86, 88. Further, in other specific applications of the present invention, the entire weld path is separate from the coordinate reference frame such that the weld path does not intersect the defined frame of reference.

Figure 5:
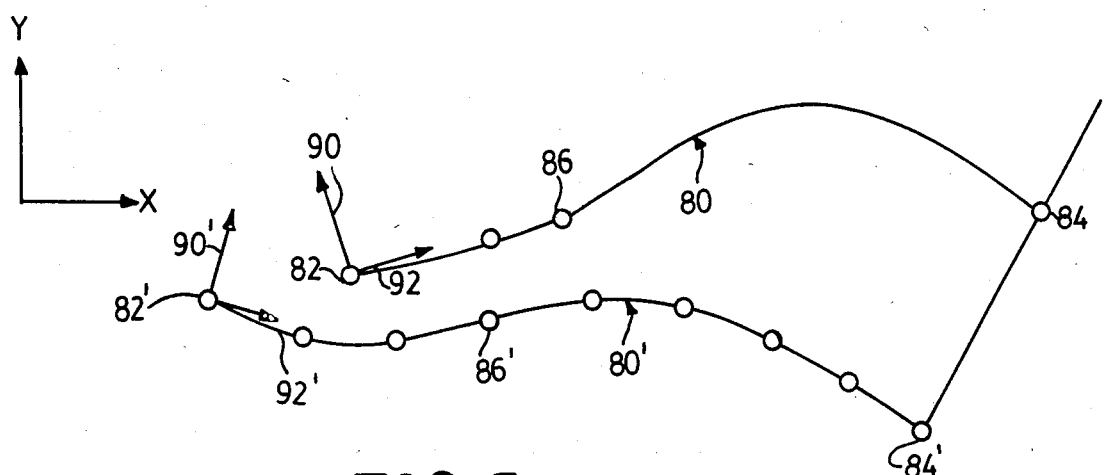
FIG. 5 is a graphical representation similar to FIG. 4 and illustrating the relationship between the taught corner coordinate frame and the weld path and the new corner coordinate frame and the weld path presented by a workpiece at a different position and orientation.

Referring now to FIG. 5, the nominal, taught, reference weld path 80 and corresponding frame of reference 90,92 representing the weld path with respect to a weld workpiece at a reference position and orientation is shown along with a coordinate frame 90',92' and weld path 80' corresponding to the weld path with respect to a weld workpiece at a position and orientation different than the reference position.

During the repeat phase of operation when a successive workpiece is presented at an arbitrary position and orientation, the sensing system including the projector 30, camera 28, image processor 40 and system controller 44 are operated to measure and define the new corner coordinate frame of reference 90',92'. From the new corner coordinate frame of reference 90',92', the sensing positions, weld start position, and weld end position are calculated in work world coordinates of the manipulator arm by the system controller 44. For example, each sensing point such as 86,88 and the end weld point 84 and the start weld point 82 are modified in accordance with the following relationship:

$$P_{new} = C_{new} \cdot P_c, \quad (1)$$

where $P_{new}$ is a 4×4 homogenous transformation defining the position and orientation of the updated point, $C_{new}$ is a 4×4 homogenous transformation defining the new corner frame, e.g. 90',92', and $P_c$ is a 4×4 homogenous transformation matrix defining position and orientation relative to the corner coordinate frame 90,92 or 90',92' of the workpiece.

Accordingly in the sense pass denoted as the first repeat pass, the manipulator arm is controlled to move in accordance with the modified data $P_{new}$ for each of the sense, weld start and weld end points. Thus, during the first repeat pass, the control apparatus senses the image of the projected pattern on the workpiece and determines the deviation between the manipulator arm during sensing of the first repeat pass and the actual weld path presented by the workpiece.

In the preferred embodiment, the first repeat pass during which the arm is controlled in accordance with the modified data provides more accurate deviation data than was obtained and used to modify the path points in accordance with the relationship (1) relative to the new corner coordinate data. In an alternate embodiment for applications where the path distance and accuracy requirements permit, the first repeat pass is eliminated and the points as modified in accordance with relationship (1) are utilized directly to perform the second repeat welding pass. In the preferred arrangement, the deviation data obtained from the first pass is utlized to further correct the path points.

Figure 6:
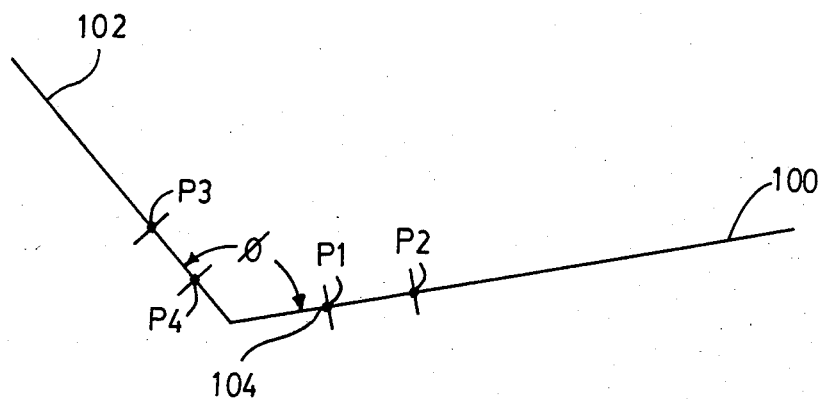
FIG. 6 is an enlarged graphical representation of the corner coordinate frame of reference of FIGS. 4 and 5.

Referring now to FIG. 6, a convenient frame of reference as defined by the geometry of the weld workpiece in accordance with the present invention can be defined in various manners. As discussed previously, one convenient frame of reference is a corner coordinate frame defined at the edge of the workpiece. For the example of a corner coordinate frame, the control apparatus via the camera 28 and image processor 40 defines the four points P1, P2, P3 and P4. For example, P1 and P2 are defined along an X frame axis 100 formed by one boundary of the workpiece and P3 and P4 are defined along line 102 corresponding to a second boundary of the workpiece. Where the included angle $\phi$ is known between the lines 100 and 102, it is only necessary to define three points, e.g. P1, P2 and P3. The frame of reference in FIG. 6 is illustrative of one method of reference frame definition and defines the origin 104 at P1 and the Y frame axis along the direction pointing from P1 toward P3. The Z axis is defined as the cross product of the unit vector $\hat{u}$ along the X axis and $\hat{v}$ along the Y axis. In this manner, a reference frame $C_T$ is defined as a 4×4 homogenous tranformation matrix.

The points P1, P2, P3 and P4 can be determined by the operator moving the manipulator arm to each of the locations and recording the points during teaching along with recording by the vision system of an appropriate template image or images of the projected light pattern for points corresponding to light patterns different than the template reference image of the welding path. For example, if points P1 and P2 lie along the weld path 68 of FIG. 2 for example, the weld path reference image is suitable and a new template image need not be recorded. However, points P3 and P4 require a separate template image since they are defined by a template image different from the weld path template. In another arrangement, the points are defined by the vision system including the projection unit 30, the camera 28, the image processor 40 and the system controller 44 with the manipulator arm at a single position. The lines intersecting the lines 100, 102 in FIG. 6 at each of the points represent the position and orientation of the projected pattern on the workpiece, i.e. the illumination stripe in a specific embodiment. The definition of the points P1, P2, P3 and P4 of FIG. 6 are selected at appropriate distances from the origin at the intersection of lines 100, 102 to allow for the maximum permitted deviation of subsequent workpieces. This ensures that the intersection of the projected light pattern on the subsequent workpiece will provide appropriate images by intersection with the desired reference frame line or axis of the modified coordinate reference frame, e.g. 92 and 92' in FIG. 5.

Figure 7:
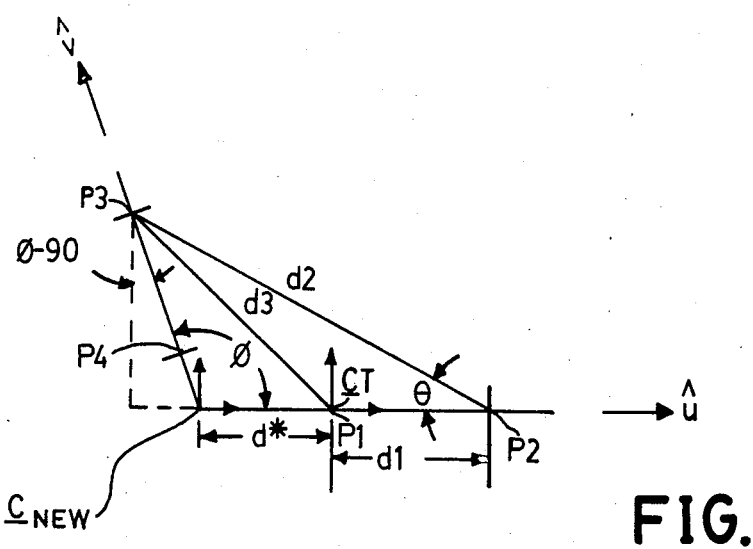
FIG. 7 is a graphical representation of the relationship between the taught corner coordinate frame and the new corner coordinate frame.

Referring now additionally to FIG. 7 there is depicted an example of simplified geometry for illustrative purposes with an X-axis shift between $C_{new}$ and $C_T$. In the repeat phase and before the first repeat pass, the new coordinate frame is sensed and defined in accordance with the following relationship:

$$\underline{C}_{new} = \underline{C}_T \begin{bmatrix} \underline{I} & -d^* \\ & 0 \\ & 0 \\ \underline{0} & 1 \end{bmatrix} = \underline{C}_T [X\text{-axis shift } (-d^*)] \quad (2)$$

where $d^*$ as depicted in FIG. 7 is the shift along the X reference frame axis, defined as $d^* = d_2(\cos\theta - \sin\theta \tan(\phi - 90)) - d_1$. Of course in other specific examples, the general transformation relating $C_T$ and $C_{new}$ includes six degrees of freedom.

The angle $\theta$ as shown in FIG. 7 is defined as the included angle between the X frame axis and the segment $d_2$ connecting $P_2$ and $P_3$. Further $\theta$ is defined as $\cos\theta = -(d_3^2 - (d_1^2 + d_2^2))/(2d_1d_2)$ by the law of cosines, where $d_3$ is the segment between $P_1$ and $P_3$ and $d_1$ in the segment between $P_1$ and $P_2$.

The angle $\phi$ is either known or determined by $$\sin\phi = |\hat{u} \times \hat{v}|$$

and $$\cos\phi = \hat{u}\cdot\hat{v}$$

Reference may be made to the aforementioned U.S. Pat. No. 4,380,696 for a more detailed discussion of the basic operation of a vision correction system concerning path definition, teaching, sensing and detection operation and path correction. The sense points represent the path points relative to the reference workpiece at which the path correction data will be sensed and calculated during the repeat mode. However, while it is most practical to record these same points as taught points to serve as the relative path points to be modified and used during the first repeat pass, it is possible in other specific embodiments to sense and perform path deviation correction at points that are different than the taught points. However, the taught points would still be utilized during the first repeat pass with modification in accordance with the new frame of reference data as target command points to trace the sense path. Further the number of sense points and the number of path definition points may differ in specific embodiments. Of course, in specific applications, the number of sense points and path definition points vary in accordance with the complexity of the weld paths. Further in a specific embodiment, the deviation data derived during the first repeat pass is utilized to modify recorded path data defining points other than the sense points at which the deviation is calculated. In any case, the path deviation data is always measured relative to the sense path point at which the image processor is operative to sense the deviation.

Figure 8:
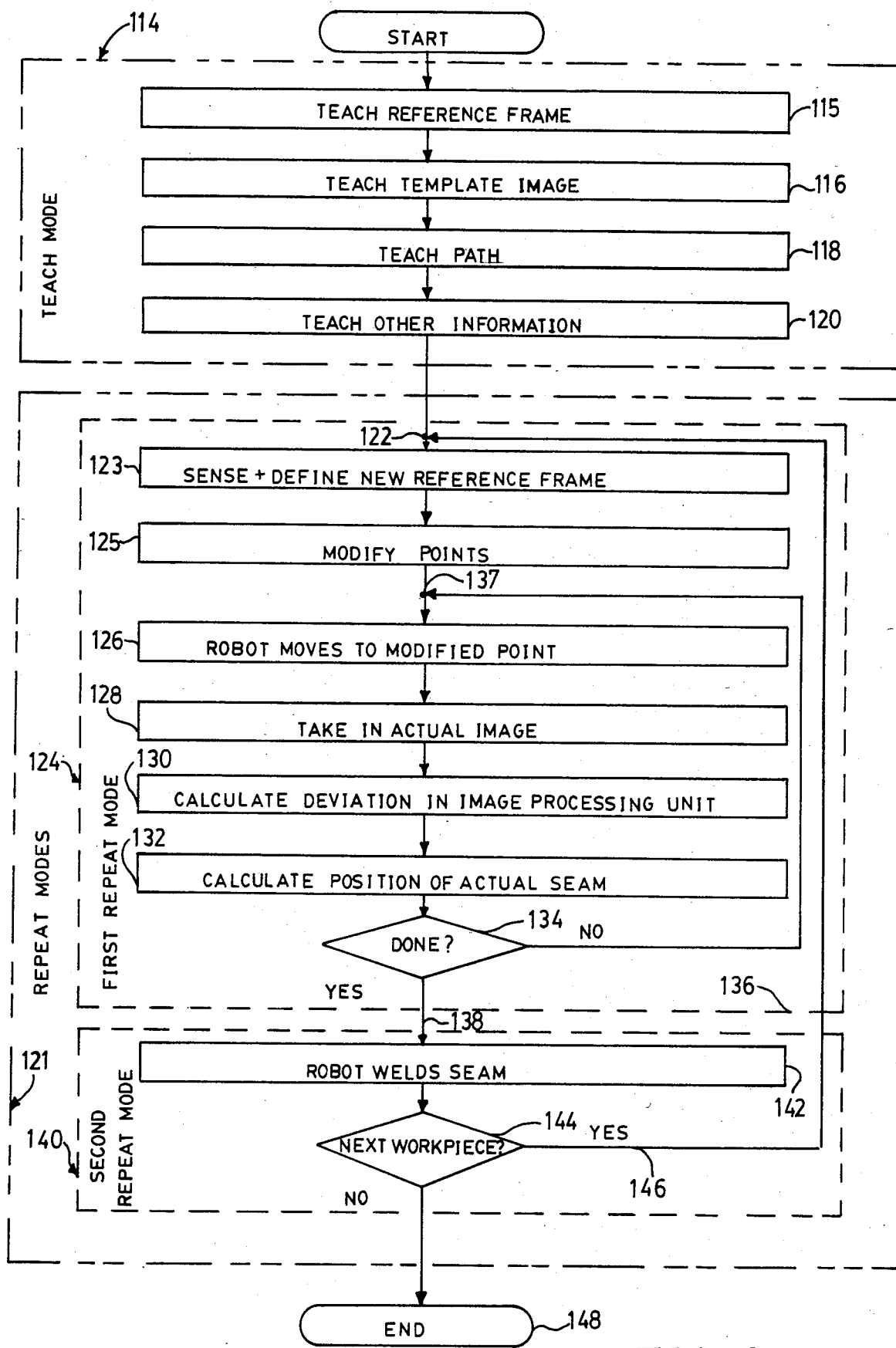
FIG. 8 is a flow diagram illustrating the method of the present invention and the general operation of the control apparatus of the present invention of FIGS. 1 through 7 to accomplish welding of a workpiece.

Considering now the basic operation of the system controller 44 and in particular the data transformation system provided therein and referring now to FIG. 8, the flow diagram of FIG. 8 represents the operation of the present invention including the additional functions performed by the system controller 44 in addition to available manipulator control arrangements such as the PUMA type 760 arm with VAL control programming discussed hereinbefore. The start of the flow program of the system controller 44 proceeds through the teach mode 114 wherein the function block 115 represents the teaching of the frame of reference data to define the corner coordinate frame for example 63, 65 of FIG. 2. The function block 116 represents the teaching of the reference template image in accordance with the data from a vision system with the camera 28 in the operative position and the projection unit 30 projecting the slit pattern resulting in image 64, 66 of FIG. 3 onto the taught reference workpiece.

After teaching the template image the program flow proceeds to a function block 118 representing the teaching of the desired welding path on the reference workpiece 14 for example by the movement of the manipulator along the welding path 68 of FIG. 3 and the storing of path points for example 82, 86, 88, 84 as defined relative to the frame of reference. The program flow proceeds to a function block 120 wherein other appropriate teaching information is recorded such as the desired welding speed and other parameters of the welding operation. The teach step 120 also includes appropriate weld gun and camera position definition data as may be necessary due to offsets of the weld gun point and optical center point of the manipulator hand from a reference point. In accordance with VAL programming, the teach step 120 includes the inputting of data representing and defining either the offsets of the hand 24 in the camera and weld gun positions or two separately attached hands in a specific arrangement wherein a camera hand and a separate weld gun hand are provided.

The program flow of the system controller 44 then proceeds to the repeat modes 121 and specifically at flow point 122 into the first repeat mode or pass 124. In the first repeat mode 124, a function block 123 represents the sensing and defining of the new reference frame for example as shown in FIGS. 5 and 7. The program flow of the first repeat pass proceeds to a function block 125 representing the modification of the recorded path points in accordance with the new sensed reference frame data. Next the program flow proceeds to a function block 126 that represents operation of the servo controller 46 to move the manipulator 10 to the modified sense point as determined by block 125. After the manipulator has been moved to the first modified sense point with the camera 28 in the operative position over the workpiece 14, an actual image is obtained from the vision system as represented by a function block 128. The flow of the program proceeds to a function block 130 wherein the image processing unit 40 calculates the deviation between the modified sense point and the actual weld path and provides the deviation to the system controller 44.

After the image processing unit has provided the deviation, the program flow proceeds to a function block 132 wherein the system controller 44 calculates a first position of the actual seam as a data point, for example 82' or 86'. When the calculation of the actual point is completed, the program flow proceeds to a decision block 134 to determine whether or not the first repeat pass has been completed encompassing the calculation of corrected path data for each of the modified sense points. If the result in decision block 104 is NO, the program flow proceeds via signal line 136 back to program flow point 137 to the function block 126. In function block 126, the modified sense point data is incremented by one data point and the first repeat pass flow 124 continues to calculate the corrected data for subsequent points as the manipulator arm 20 is moved to each of the points. It should be understood however that the flow diagram of FIG. 8 is merely illustrative of one specific embodiment of the present invention. For example in another specific embodiment the corrected data for all the points is calculated after the arm has been moved to all the modified sense points and the respective deviation data are obtained.

When the last corrected path point such as the end point 84' of FIG. 4 has been calculated in accordance with the image taken from the modified sense pass, the result in the decision block 134 is yes and the program flow proceeds through flow point 138 to the second repeat mode or second repeat pass 140 of the repeat mode 121. In the second repeat mode 140, a function block 142 proceeds to condition the manipulator 10 for welding the actual seam of the workpiece in accordance with the actual welding path 80' defined by the corrected data points stored in the system controller 44 as a result of the first repeat mode 124. Now with the weld gun 26 in the operative position, the function block 142 further represents the control of the manipulator 10 to weld the actual seam with appropriate control of the welding equipment 32 and the desired recorded speed of movement along the actual path 80' in accordance with the data entered in the teach mode. Thus, the manipulator arm 20 is controlled to move the weld gun 26 over the path for example defined by the points 82', 86', 80', 84' and additional intermediate points.

After the completion of the weld path 80', the program flow proceeds to the decision block 144 to determine whether the next workpiece to be welded is in position. If the determination is YES signifying that another workpiece is to be welded and is in position for welding, the program flow proceeds from the decision block 144 over the signal path 146 to the flow point 122 at the beginning of the first repeat mode 124.

Thus for the next workpiece, the first and second repeat modes 124 and 140 respectively are accomplished with the reference frame defined by the next workpiece being sensed, the modified sense points being calculated, the workpiece being sensed in the first repeat mode, the actual welding path being calculated, and the welding path being welded in the second repeat mode.

If the determination in the block 144 results in an indication that there is no additional workpiece to be welded, the program flow proceeds to an end of program function 148 with appropriate termination of the program. The next workpiece indication in the block 144 is provided in specific arrangements by either external operator input, or by control inputs of the system controller 44 via automated workpiece transfer apparatus, or by a sensing function performed by the manipulator 10.

While there has been illustrated and described several embodiments of the present invention, it will be apparent that various changes and modifications thereof will occur to those skilled in the art. For example, various types of vision systems are utilized in various specific embodiments utilizing various forms of electromagnetic wave generation by the projection unit and complementary sensing-detection devices. It is intended in the appended claims to cover all such changes and modifications as fall within the true spirit and scope of the present invention.

What is claimed as new and desired to be secured by Letters Patent of the United States is:

1. Control apparatus for manipulator welding apparatus having a manipulator arm controllable in one or more axes and arranged to perform a predetermined weld program on a workpiece at a workpiece station, the weld program being of the type that includes predetermined weld points or weld paths defined by a plurality of points, the control apparatus comprising:
    means for projecting a predetermined energy pattern on a workpiece at the workpiece station;
    means for storing reference data representing the weld program and a coordinate reference frame defined by the workpiece in accordance with said projected energy pattern from which coordinate reference frame the weld program can be defined with respect to a workpiece at a predetermined reference position at the work station;
    means for sensing said coordinate reference frame with respect to a subsequent workpiece in accordance with said projected energy pattern and for determining modified coordinate reference frame data; and
    means responsive to said modified coordinate reference frame data for moving said manipulator arm to perform the motion of the weld program.

2. The control apparatus of claim 1 wherein said arm moving means comprises means for determining modified weld program data in accordance with said modified coordinate reference frame data to account for any changes in position and orientation of said subsequent workpiece with respect to said reference position.

3. The control apparatus of claim 2 wherein said modified weld program data defines weld program positions, said modified weld program positions being defined by modifying said stored reference image data by the change in orientation and position between said sensed coordinate frame of said subsequent workpiece and said coordinate reference frame defined by a workpiece at said reference position.

4. The control apparatus of claim 2 wherein said arm moving means further comprises means responsive to said modified weld program data and said projected energy pattern for moving said arm over said weld program motions and for providing weld program correction data representing the difference between the position of the actual weld program presented by said subsequent workpiece and the position resulting from moving said arm in accordance with said modified weld program data.

5. The control apparatus of claim 4 further comprising means responsive to said weld program correction data for providing corrected weld program data, said arm moving means being responsive to said corrected weld program data for moving said arm to perform the weld program on said subsequent workpiece.

6. The control apparatus of claim 4 wherein said correction data providing means comprises image processor means for sensing said projected energy patterns at each of a predetermined plurality of sense points defined by said weld program and for generating the deviation between each of said sense points and said actual weld path defined by said subsequent workpiece.

7. The control apparatus of claim 1 wherein said stored reference image data representing the weld program includes weld program point position data, said weld program point position data defining weld program points with respect to said coordinate reference frame.

8. The control apparatus of claim 7 wherein said weld program points are defined as a relative position with respect to said coordinate reference frame.

9. The control apparatus of claim 7 wherein said weld program point position data includes start and end positions defining the start and end of a desired weld path.

10. The control apparatus of claim 1 wherein said coordinate reference frame is defined by two intersecting lines at an edge of the workpiece.

11. The control apparatus of claim 10 wherein said coordinate reference frame is defined by two points on each of said two intersecting lines.

12. The control appratus of claim 10 wherein said coordinate reference frame is defined by two points on one of said two intersecting lines, a third point on said second intersecting line, and the included angle defined between said two intersecting lines.

13. The control apparatus of claim 1 wherein said corner coordinate frame is defined by the geometry of the workpiece.

14. The control apparatus of claim 1 wherein said projecting means comprises a projector that projects a predetermined slit light pattern.

15. The control apparatus of claim 14 wherein said sensing means comprises video image acquisition means responsive to said projected slit pattern.

16. A method for controlling manipulator apparatus to perform a predetermined work cycle relative to a workpiece defined relative to the position and orientation of the workpiece comprising the steps of:

projecting a predetermined energy pattern on a reference workpiece at a workpiece station;

defining the predetermined work cycle relative to a frame of reference defined by said reference workpiece;

storing reference image data representing the predetermined work cycle and said frame of reference defined by said reference workpiece;

sensing a subsequent workpiece in accordance with the projected energy pattern to determined the frame of reference thereof corresponding to said frame of reference defined by said reference workpiece;

determining the change in orientation and position between said frame of reference of said sensed subsequent workpiece and said frame of reference defined by said reference workpiece;

modifying said stored reference image data in accordance with said determined change in orientation and position of said frame of reference; and moving said manipulator arm with respect to said subsequent workpiece in accordance with said modified data.

* * * * *